(12) United States Patent
Hrbatovic

(10) Patent No.: US 11,749,956 B2
(45) Date of Patent: Sep. 5, 2023

(54) MOBILE DEVICE ELECTRICAL OUTLET

(71) Applicant: Mirnes Hrbatovic, Carlisle, PA (US)

(72) Inventor: Mirnes Hrbatovic, Carlisle, PA (US)

( * ) Notice: Subject to any disclaimer, the term of this patent is extended or adjusted under 35 U.S.C. 154(b) by 0 days.

(21) Appl. No.: 17/698,432

(22) Filed: Mar. 18, 2022

(65) Prior Publication Data

US 2022/0302657 A1    Sep. 22, 2022

Related U.S. Application Data

(60) Provisional application No. 63/162,151, filed on Mar. 17, 2021.

(51) Int. Cl.
*H02J 7/00* (2006.01)
*H01R 25/00* (2006.01)
*H01R 13/72* (2006.01)
*H01R 13/713* (2006.01)

(52) U.S. Cl.
CPC .......... *H01R 13/72* (2013.01); *H01R 13/713* (2013.01); *H01R 25/006* (2013.01); *H02J 7/0042* (2013.01)

(58) Field of Classification Search
CPC .... H01R 13/72; H01R 13/713; H01R 25/006; H01R 13/506; H02J 7/0042; H02J 7/0013; H02J 2207/30
See application file for complete search history.

(56) References Cited

U.S. PATENT DOCUMENTS

2015/0028797 A1* 1/2015 Miller .................. H02J 7/0045
                                                  320/103
2020/0388972 A1* 12/2020 Byrne .................... H01R 31/06

* cited by examiner

*Primary Examiner* — Michael C Zarroli
(74) *Attorney, Agent, or Firm* — The Iwashko Law Firm, PLLC; Lev Ivan Gabriel Iwashko

(57) ABSTRACT

A mobile device electrical outlet, including a main body, a plurality of sockets removably disposed within at least a portion of an interior of the main body to provide electrical power in response to receiving a connection from an electrical plug, and a plurality of charging cords disposed within at least a portion of the interior of the main body to provide electrical power in response to receiving a connection from a mobile device.

5 Claims, 1 Drawing Sheet

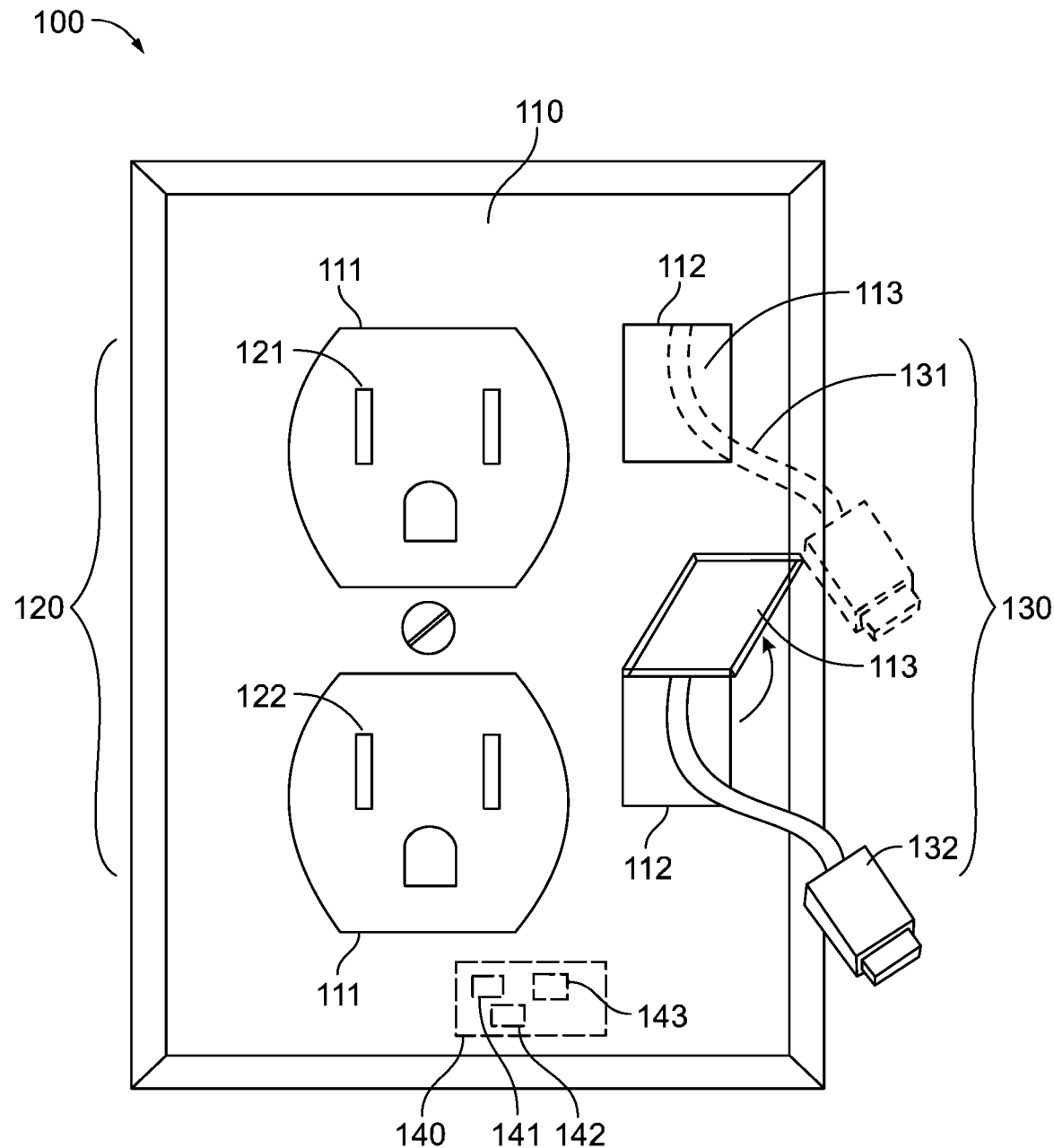

MOBILE DEVICE ELECTRICAL OUTLET

CROSS REFERENCE TO RELATED APPLICATION

This application claims the benefit of, and incorporates by reference, U.S. provisional patent application Ser. No. 63/162,151, entitled "Mobile Device Electrical Outlet," which was filed on Mar. 17, 2021.

BACKGROUND

1. Field

The present general inventive concept relates generally to an electrical outlet, and particularly, to a mobile device electrical outlet.

2. Description of the Related Art

Mobile phones are a type of mobile device that are important to many people as a means to connect and to perform personal, social, and/or professional tasks. However, mobile phones require electrical power to function, which puts a time limit on how long a user can use a mobile phone. In particular, every mobile phone has a battery that loses charge over time.

As such, the mobile phone will need to receive power from an external power source, such as an electrical outlet. A conventional electrical outlet has two sockets to receive a plug from an electrical device. Not surprisingly, the user will return the mobile phone to the conventional electrical outlet to be charged. There are different types of mobile phones that require different cords to connect to the external power source. Also, many people tend to lose their cords and/or simply forget where the cords are located. These restrictions tend to stop people from charging the battery, which prevents them from using the mobile phone to make and/or receive calls, texts, emails, etc.

Therefore, there is a need for an electrical outlet that includes cords that can charge a mobile device.

SUMMARY

The present general inventive concept provides a mobile device electrical outlet.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a mobile device electrical outlet, including a main body, a plurality of sockets removably disposed within at least a portion of an interior of the main body to provide electrical power in response to connecting an electrical plug thereto, and a plurality of charging cords disposed within at least a portion of the interior of the main body to provide electrical power in response to connecting a mobile device thereto.

The main body may include a plurality of cord apertures disposed on at least a portion of the main body to receive the plurality of charging cords therethrough, and a plurality of aperture covers springingly disposed on at least a portion of the main body to cover the plurality of cord apertures in a first position and at least partially open away from the plurality of cord apertures in a second position.

Each of the plurality of charging cords may move from retracted within the main body in a first lateral position to at least partially extended outside the main body in a second lateral position, and moves from extended outside the main body in the second lateral position to retracted within the main body in the first lateral position.

Each of the plurality of charging cords may be connected to a spring to retract automatically within the main body in response to being tugged.

The mobile device electrical outlet may further include a safety unit disposed within at least a portion of the main body to disable at least one of the plurality of sockets and the plurality of charging cords in response to detecting a pressure level against at least one of the main body, the plurality of sockets, and the plurality of charging cords exceeding a predetermined pressure level indicating a living being is in contact with at least one of the main body, the plurality of sockets, and the plurality of charging cords.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a perspective view of a mobile device electrical outlet, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including,"

when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Mobile Device Electrical Outlet 100
Main Body 110
Socket Apertures 111
Cord Apertures 112
Aperture Covers 113
Sockets 120
First Socket 121
Second Socket 122
Charging Cords 130
First Charging Cord 131
Second Charging Cord 132
Safety Unit 140
Processing Unit 141
Sensor 142
Circuit Switch 143

FIG. 1 illustrates a perspective view of a mobile device electrical outlet 100, according to an exemplary embodiment of the present general inventive concept.

The mobile device electrical outlet 100 may be constructed from at least one of metal, plastic, and rubber, etc., but is not limited thereto.

The mobile device electrical outlet 100 may include a main body 110, a plurality of sockets 120, a plurality of charging cords 130, and a safety unit 140, but is not limited thereto.

The main body 110 may include a plurality of socket apertures 111, a plurality of cord apertures 112, and a plurality of aperture covers 113, but is not limited thereto.

The main body 110 may be an outer plate disposed on an external surface (e.g., a wall) and/or may be a housing of the mobile device electrical outlet 100 including all other components thereon and/or therein.

The plurality of socket apertures 111 may be disposed on at least a portion of the main body 110.

The plurality of cord apertures 112 may be disposed on at least a portion of the main body 110.

Each of the plurality of aperture covers 113 may be hingedly and/or springingly disposed on at least a portion of the main body 110. More specifically, the plurality of aperture covers 113 may at least partially cover the plurality of cord apertures 112. Moreover, the plurality of aperture covers 113 may move from closed in a first position to at least partially opened in a second position. Conversely, the plurality of aperture covers 113 may move from opened in the second position to closed in the first position.

The plurality of sockets 120 may include a first socket 121 and a second socket 122, but is not limited thereto.

Referring to FIG. 1, the first socket 121 may be removably disposed within at least a portion of an interior of the main body 110. Moreover, the first socket 121 may at least partially protrude through at least one of the plurality of socket apertures 111. Additionally, the first socket 121 may be removably connected to electrical wiring, such that the first socket 121 may provide electrical power in response to connecting an electrical plug thereto.

Referring again to FIG. 1, the second socket 122 may be removably disposed within at least a portion of the interior of the main body 110. Moreover, the second socket 122 may at least partially protrude through another at least one of the plurality of socket apertures 111. Additionally, the second socket 122 may be removably connected to electrical wiring, such that the second socket 122 may provide electrical power in response to connecting the electrical plug thereto.

The plurality of charging cords 130 may include a first charging cord 131 and a second charging cord 132, but is not limited thereto.

The first charging cord 131 may include a micro universal serial bus (USB) cable, a USB cable, a USB-C cable, and a Lightning cable, but is not limited thereto.

The second charging cord 132 may include a micro universal serial bus (USB) cable, a USB cable, a USB-C cable, and a Lightning cable, but is not limited thereto.

Alternatively, a connector for the first charging cord 131 and/or the second charging cord 132 may be removed and/or exchanged for another connector different from the connector, such that the connector and/or the another connector may be any one of the cables identified above. For example, the connector of the first charging cord 131 may be a USB connector, but the another connector may be a Lightning connector.

Referring again to FIG. 1, the first charging cord 131 may be removably and/or springingly disposed within at least a portion of the interior of the main body 110. Moreover, the first charging cord 131 may move from retracted within the main body 110 in a first lateral position to at least partially extended outside the main body 110 in a second lateral position. Conversely, the first charging cord 131 may move from extended outside the main body 110 in the second lateral position to retracted within the main body 110 in the first lateral position. Additionally, the first charging cord 131 may be removably connected to electrical wiring, such that the first charging cord 131 may provide electrical power in response to connecting a mobile device (e.g., a mobile phone, a tablet computer, a laptop, a personal digital assistant (PDA), etc.) thereto. As such, the first charging cord 131 may charge the mobile device.

Furthermore, the first charging cord 131 may be moved (i.e. tugged) in the second lateral position away from the main body 110, such that the first charging cord 131 retracts automatically due to a spring bias via a spring. Also, during extension of the first charging cord 131, the first charging cord 131 may be prevented from retracting due to a ratchet within the main body 110. In other words, tugging the first charging cord 131 may release the ratchet, such that the first charging cord 131 may retract within the main body 110.

Referring again to FIG. 1, the second charging cord 132 may be removably and/or springingly disposed within at least a portion of the interior of the main body 110. Moreover, the second charging cord 132 may move from retracted within the main body 110 in a first lateral position to at least partially extended outside the main body 110 in a second lateral position. Conversely, the second charging cord 132 may move from extended outside the main body 110 in the second lateral position to retracted within the main body 110 in the first lateral position. Additionally, the second charging cord 132 may be removably connected to electrical wiring, such that the second charging cord 132 may provide electrical power in response to connecting the mobile device thereto. As such, the second charging cord 132 may charge the mobile device.

Furthermore, the second charging cord 132 may be moved (i.e. tugged) in the second lateral position away from the main body 110, such that the second charging cord 132 retracts automatically due to a spring bias via a spring. Also, during extension of the second charging cord 132, the second charging cord 132 may be prevented from retracting due to a ratchet within the main body 110. In other words, tugging the second charging cord 132 may release the ratchet, such that the second charging cord 132 may retract within the main body 110.

The safety unit 140 may include a processing unit 141, a sensor 142, and a circuit switch 143, but is not limited thereto.

The processing unit 141 (or central processing unit, CPU) may include electronic circuitry to carry out instructions of a computer program by performing basic arithmetic, logical, control and input/output (I/O) operations specified by the instructions. The processing unit 141 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 141 may also include a microprocessor and a microcontroller.

The sensor 142 may include a temperature sensor and a pressure sensor, but is not limited thereto.

The sensor 142 may detect a temperature level of the main body 110, the plurality of sockets 120, and/or the plurality of charging cords 130, and/or a pressure level against the main body 110, the plurality of sockets 120, and/or the plurality of charging cords 130. Moreover, the processing unit 141 may receive the temperature level and/or the pressure level from the sensor 142 to compare to a predetermined temperature level, a predetermined temperature range of a living being (e.g., a temperature of a person, a temperature of an animal, etc.), and/or a predetermined pressure level that indicates the living being is in contact with the main body 110, the plurality of sockets 120, and/or the plurality of charging cords 130. As such, the processing unit 141 may transmit a disable command to the circuit switch 143 in response to the temperature level of the main body 110, the plurality of sockets 120, and/or the plurality of charging cords 130, and/or the pressure level against the main body 110, the plurality of sockets 120, and/or the plurality of charging cords 130 being equivalent to and/or exceeding the predetermined temperature level, the predetermined temperature range, and/or the predetermined pressure level, respectively. As such, the circuit switch 143 may prevent the plurality of sockets 120 and/or the plurality of charging cords 130 from providing electrical power while the temperature level of the main body 110, the plurality of sockets 120, and/or the plurality of charging cords 130, and/or the pressure level against the main body 110, the plurality of sockets 120, and/or the plurality of charging cords 130 is equivalent to and/or exceeds the predetermined temperature level, the predetermined temperature range, and/or the predetermined pressure level, respectively.

As such, the safety unit 140 may prevent the plurality of sockets 120 and/or the plurality of charging cords 130 from electrocuting the living being.

Therefore, the mobile device electrical outlet 100 may provide electrical outlets for the mobile device, such that external cords are not needed. Also, the mobile device electrical outlet 100 may accommodate different types of mobile devices due to having different cables and/or connectors for the mobile device.

The present general inventive concept may include a mobile device electrical outlet 100, including a main body 110, a plurality of sockets 120 removably disposed within at least a portion of an interior of the main body 110 to provide electrical power in response to connecting an electrical plug thereto, and a plurality of charging cords 130 disposed within at least a portion of the interior of the main body 110 to provide electrical power in response to connecting a mobile device thereto.

The main body 110 may include a plurality of cord apertures 112 disposed on at least a portion of the main body 110 to receive the plurality of charging cords 130 therethrough, and a plurality of aperture covers 113 springingly disposed on at least a portion of the main body 110 to cover the plurality of cord apertures 112 in a first position and at least partially open away from the plurality of cord apertures 112 in a second position.

Each of the plurality of charging cords 130 may move from retracted within the main body 110 in a first lateral position to at least partially extended outside the main body 110 in a second lateral position, and moves from extended outside the main body 110 in the second lateral position to retracted within the main body 110 in the first lateral position.

Each of the plurality of charging cords 130 may be connected to a spring to retract automatically within the main body 110 in response to being tugged.

The mobile device electrical outlet 110 may further include a safety unit 140 disposed within at least a portion of the main body 110 to disable at least one of the plurality of sockets 120 and the plurality of charging cords 130 in response to detecting a pressure level against at least one of the main body 110, the plurality of sockets 120, and the plurality of charging cords 130 exceeding a predetermined pressure level indicating a living being is in contact with at least one of the main body 110, the plurality of sockets 120, and the plurality of charging cords 130.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A mobile device electrical outlet, comprising:
  a main body, comprising:
    a plurality of cord apertures disposed on at least a portion of the main body to receive the plurality of charging cords therethrough, and
    a plurality of aperture covers springingly disposed on at least a portion of the main body to cover the plurality of cord apertures in a first position and at least partially open away from the plurality of cord apertures in a second position;
  a plurality of sockets removably disposed within at least a portion of an interior of the main body to provide electrical power in response to connecting an electrical plug thereto; and a plurality of charging cords disposed within at least a portion of the interior of the main body to provide electrical power in response to connecting a mobile device thereto.

2. The mobile device electrical outlet of claim 1, wherein each of the plurality of charging cords moves from retracted within the main body in a first lateral position to at least partially extended outside the main body in a second lateral position, and moves from extended outside the main body in the second lateral position to retracted within the main body in the first lateral position.

3. The mobile device electrical outlet of claim 1, wherein each of the plurality of charging cords is connected to a spring to retract automatically within the main body in response to being tugged.

4. The mobile device electrical outlet of claim 1, further comprising:
a safety unit disposed within at least a portion of the main body to disable at least one of the plurality of sockets and the plurality of charging cords in response to detecting a pressure level against at least one of the main body, the plurality of sockets, and the plurality of charging cords exceeding a predetermined pressure level indicating a living being is in contact with at least one of the main body, the plurality of sockets, and the plurality of charging cords.

5. A mobile device electrical outlet, comprising:
a main body;
a plurality of sockets removably disposed within at least a portion of an interior of the main body to provide electrical power in response to connecting an electrical plug thereto;
a plurality of charging cords disposed within at least a portion of the interior of the main body to provide electrical power in response to connecting a mobile device thereto; and
a safety unit disposed within at least a portion of the main body to disable at least one of the plurality of sockets and the plurality of charging cords in response to detecting a pressure level against at least one of the main body, the plurality of sockets, and the plurality of charging cords exceeding a predetermined pressure level indicating a living being is in contact with at least one of the main body, the plurality of sockets, and the plurality of charging cords.

\* \* \* \* \*